March 18, 1930.  H. N. BERRY  1,750,952
COTTON PICKER
Filed April 23, 1927  2 Sheets-Sheet 1
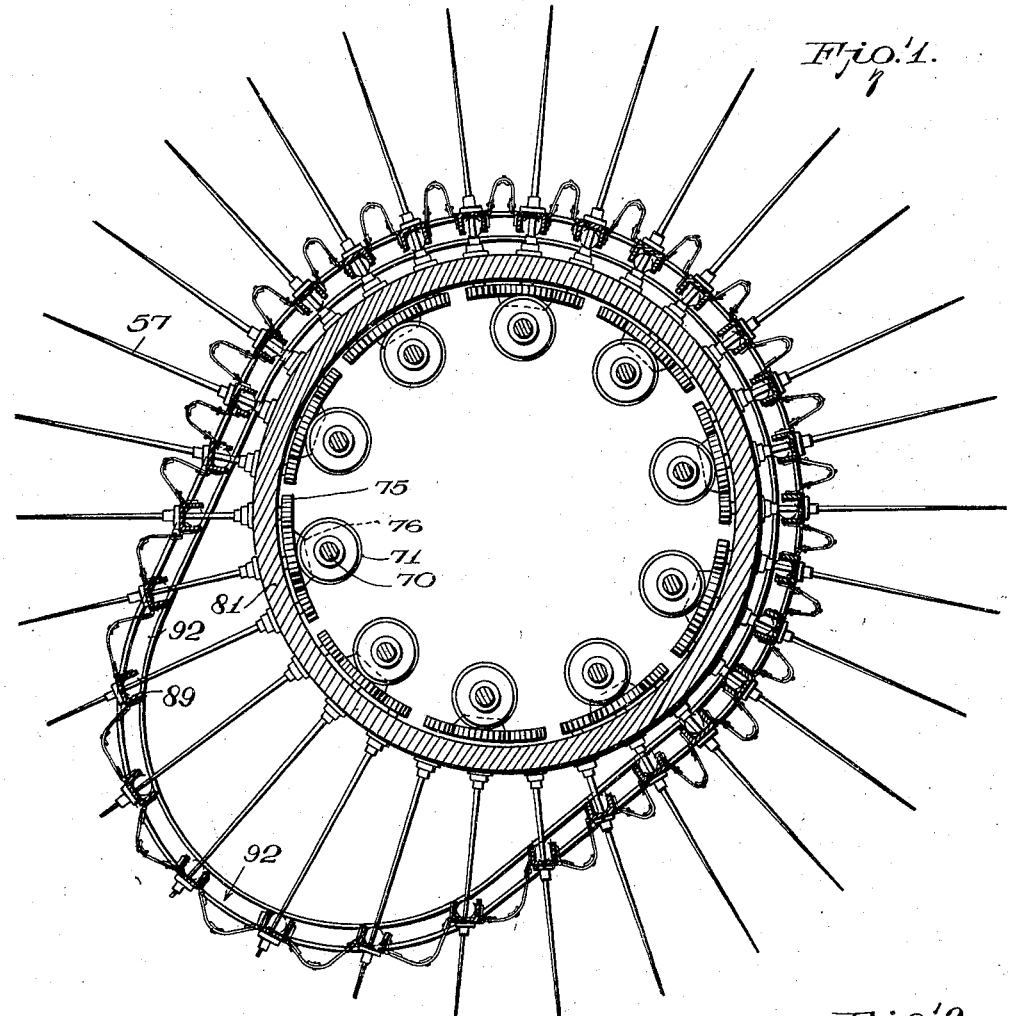
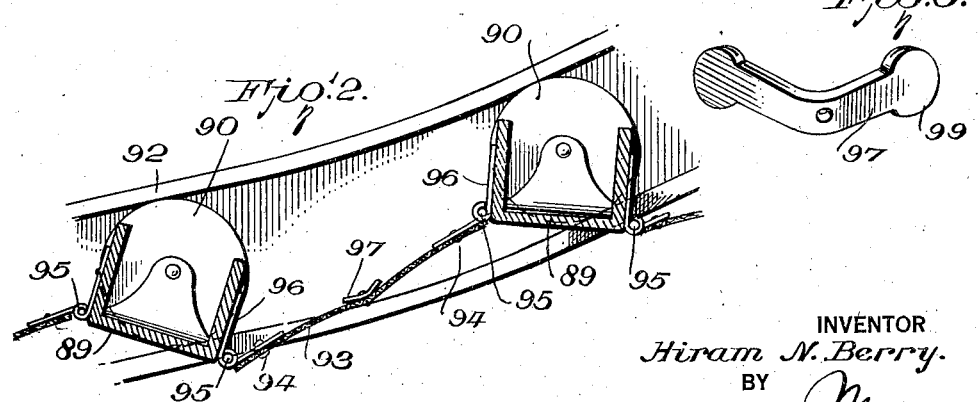
INVENTOR
Hiram N. Berry.
BY
ATTORNEY

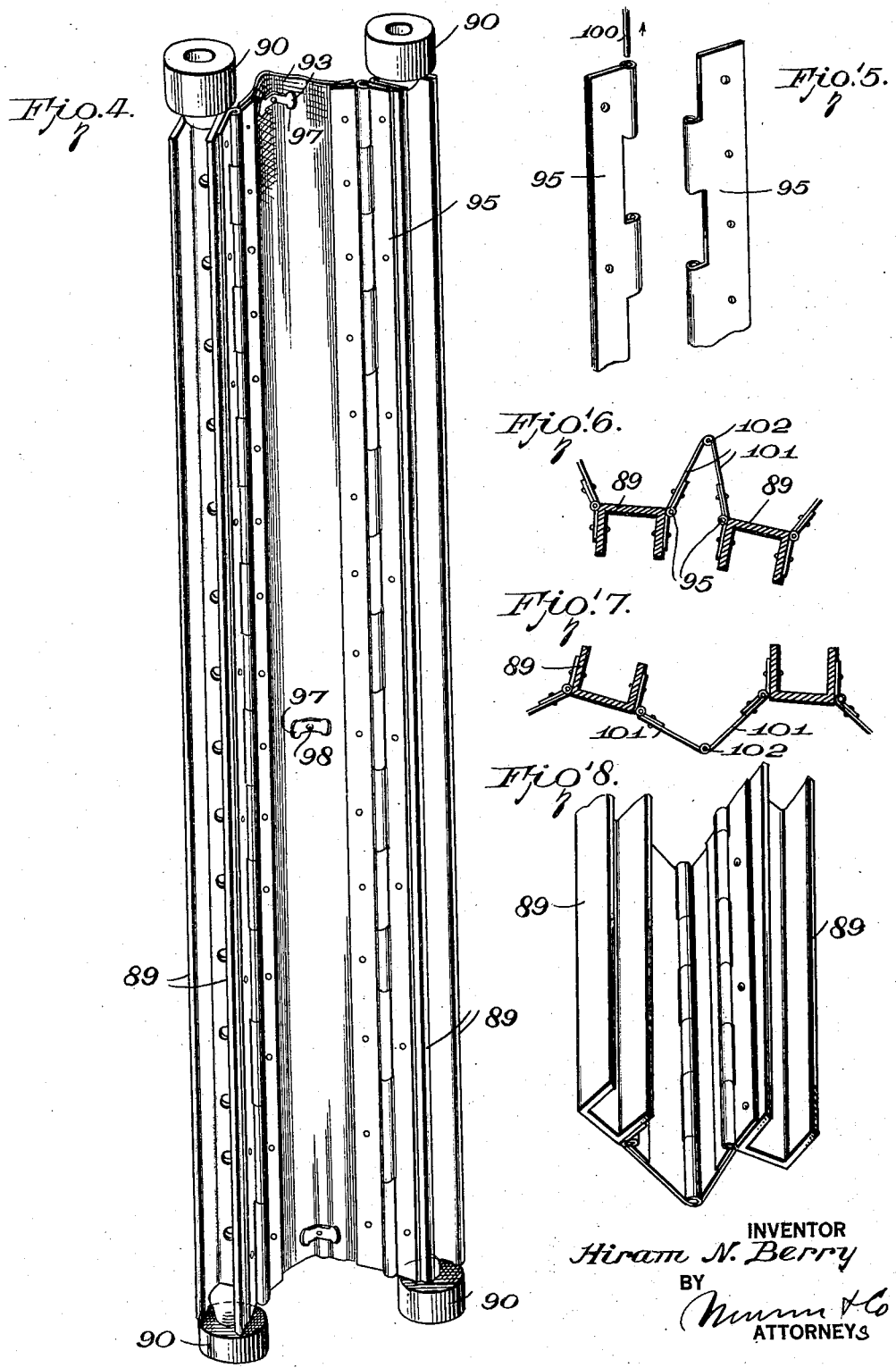

Patented Mar. 18, 1930

1,750,952

UNITED STATES PATENT OFFICE

HIRAM NEWTON BERRY, OF GREENVILLE, MISSISSIPPI, ASSIGNOR, BY DIRECT AND MESNE ASSIGNMENTS, TO COTTON HARVESTER CORPORATION OF AMERICA, OF GREENVILLE, MISSISSIPPI, A CORPORATION OF DELAWARE

COTTON PICKER

Application filed April 23, 1927. Serial No. 186,143.

This invention relates to improvements in cotton pickers, and it consists in the constructions, combinations and arrangements herein described and claimed.

An object of the invention is to provide an improvement in a cotton picker of the spindle type by which the collection and packing of cotton around behind certain stripper bars which clear the spindles of cotton, is prevented.

Another object of the invention is to provide movable or flexible aprons between the adjacent stripper bars of the packing spindles, these aprons serving as guards to prevent the passage of wisps of cotton around the stripper bars from the outer to the inner portions of the spindles.

Other objects and advantages appear in the following specification, reference being had to the accompanying drawings, in which, Figure 1 is a horizontal section of a cotton picking machine cylinder illustrating the application of the aprons to the stripper bars of the picking spindles.

Figure 2 is a detail horizontal section showing the application of an apron between adjacent stripper bars perhaps more clearly.

Figure 3 is a detail perspective view of one of the clips used in connection with the apron in Figures 1 and 2.

Figure 4 is a detail perspective view of a pair of stripper bars and the apron therebetween as seen from the inside.

Figure 5 is a detail perspective view of a portion of one of the hinges by which an edge of the apron is attached to the adjacent stripper bar.

Figure 6 is a detail horizontal section illustrating the use of an apron made of hinged plates.

Figure 7 is a detail horizontal section showing the action of the apron in Figure 6 when the stripper bar is actuated.

Figure 8 is a detail perspective view of a pair of the stripper bars again showing the application of the hinged-plate apron.

Reference may be had to my co-pending application for Letters Patent for Cotton pickers, filed January 14, 1926, Serial No. 8,134, of which the present invention is an improvement. It is deemed unnecessary to show and describe much of the mechanism disclosed in said application, such parts of the cotton picker in said application as are herein involved being briefly described as follows:

The cylinder 81 is one of a pair of cylinders revolubly mounted upon the framework of the cotton picker. Spindles 57, arranged in vertical rows around the circumference of the cylinder 81, radiate from the cylinder as shown in Figure 1. Each spindle is provided with a gear 75 on the extreme inner end, that is to say, the end within the cylinder 81. The spindles are geared together in groups of three, the central one of the three gears having an associated bevelled gear 76 meshing with and being driven by a gear 71 on a vertical shaft 70 which is rotatably mounted within the revoluble cylinder 81. The same construction prevails in the case of each group of spindles.

Stripper elements in the form of bars 89 strip the spindles of the cotton collected thereby. These stripper bars move outwardly and inwardly upon determined rows of the spindles during revolution of the cylinder 81 and forward passage of the machine. It is deemed sufficient to refer to the foregoing application for a full disclosure of the mechanism by which the stripper bars are moved outwardly and inwardly upon the revolving spindles, and to say that each stripper bar has rollers 90 at the upper and lower ends riding in fixed cams 92 at the top and bottom, the bottom cam 92 being indicated in Figure 1.

Upon reference to the foregoing application it will be found that use is made of certain flexible floating belts which are disposed horizontally between the several rows of picking spindles and immediately adjacent to the outer faces of the several stripper bars 89. The purpose of these belts is to prevent wisps of cotton passing around the stripper bars from the outer to the inner portions of the spindles because it will obviously interfere with the proper operation of the machine to have collection and jamming of cotton at the bases of the spindles.

*The invention* provides an improvement upon the foregoing floating belts. It comprises aprons disposed between the vertical stripper bars 89. The aprons must be movable to a sufficient extent to accommodate the lateral relative movement of the stripper bars as they pass around the cylinder 81 at the bases of some of the spindles and out to the extremities of others of the spindles.

In Figures 1 to 4 inclusive the apron 93 is composed of a flexible strip of suitable dimensions and of material such as canvas, other suitable fabric, leather, or in fact of any substance which has the qualification of flexibility and the necessary strength to suit the particular purpose to which it is put.

The vertical edges of this strip are secured at 94 to the free leaves of hinges 95, the complementary leaves of which hinges are secured at 96 to the sides of the adjacent stripper bars 89. In order to prevent undue tension upon and stretching of the flexible aprons 93 when stretched to the maximum as at the lower left of Figure 1, the aprons are made somewhat oversize so that they will buckle outward slightly as shown.

Clips 97 (Figures 3 and 4) perform a function principally in the closing of the aprons. Due to the fact that the stripper bars move relatively close to each other when arriving at the bases of the spindles the aprons necessarily become buckled. It is desirable to prevent the wrinkling of the aprons at this time and to cause them to assume a more symmetric and substantially V-shaped formation. It is noted that the clips 97 are bent into a substantial V-shape and riveted or otherwise secured at 98 (Figure 4) to the inside of the apron 93. These V-shaped clips have the tendency of causing the aprons to stand out in the desired position and to prevent the foregoing objectionable wrinkling.

Ordinarily three of the clips will be sufficient to accomplish the purpose, although obviously more may be used if desired. The extremities of the clips are slightly enlarged and rounded as at 99 thus offering sufficiently broad contacting surfaces to avoid damage to the adjacent parts of the apron. The use of hinges 95 in connection with the flexible aprons is deemed to be of some importance. It sometimes happens that an apron must be quickly taken down from the stripper bars. This is readily accomplished by merely withdrawing the hinged pin 100 (Figure 5) whereupon the parts can be disassembled at once. An apron can be put in place with equal ease, namely by merely reinserting the hinged pin.

Figures 6, 7 and 8 illustrate a modification. The foregoing flexible apron is now substituted by plates 101 which are hingedly connected along the substantially central vertical portions thereof as at 102, the otherwise free edges of the plates being connected with the stripper bars 89 by means of hinges 95 as before. The hinged plates 101 will open and close, so to speak, in conformity with the lateral relative motion of the stripper bars very much on the order of the flexible apron 93. It is believed to be an optional matter to use two or more hingedly connected plates, but by using the hingedly connected plates 101 as in Figure 6 it seems evident that there will be closer conformity to the action of the flexible apron 93 than if more than two plates were used. In other words, the use of two hingedly connected plates will permit the desirable V-formation when adjacent stripper bars are in relatively closed position upon the spindles.

*The operation* is readily understood. The spindles 57 revolve upon their own axes as the cylinder 81 turns upon the framework of the machine. The stripper bars 89 perforce must travel with the spindles, and by virtue of the fact that the rollers at the upper and lower ends are guided in relatively stationary cams of a shape as shown in Figure 1, it follows that the stripper bars will move outwardly and inwardly upon the spindles thus to perform the stripping action upon any cotton collected by the spindles.

The aprons between the stripper bars, whether they be the flexible aprons 93 in Figures 1 and 2 or the semi-flexible aprons 101 in Figure 6, serve as guards or closures between the stripper bars, preventing the passage of wisps of cotton around the stripper bars to the inner portions of the spindles. The ease with which the guard aprons can be disassembled from the stripper bars has already been emphasized, and the advantages need not be repeated here.

While the construction and arrangement of the improved stripper bar aprons is that of a generally preferred form, obviously modifications and changes may be made without departing from the spirit of the invention or scope of the claims.

What I claim is:

1. In a cotton picker including a picking cylinder having peripherally outstanding picking spindles and stripper bars rotatable with the cylinder and operating lengthwise of the spindles for shifting the picked cotton outwardly along the spindles; and means affording a complete covering for the spaces between the stripper bars for the purpose described.

2. In a cotton picker, a picking cylinder having peripherally outstanding picking spindles, means including stripper elements rotatable with the cylinder and operating lengthwise of rows of picking spindles for shifting the cotton outwardly along the spindles, and aprons disposed in the spaces between said stripper elements to completely cover said spaces and prevent movement of cotton around the stripper elements from the outer to the inner portions of the picking spindles.

3. In a cotton picker, a picking cylinder having peripherally outstanding picker spindles, means including vertically disposed stripper bars rotatable with the cylinder and operating lengthwise of vertical rows of picking spindles for shifting cotton outwardly along the spindles, and means connected to and between adjacent stripper bars to close the space between such stripper bars to prevent accidental movement of cotton around the stripper bars from the outer to the inner portions of the picking spindles.

4. In a cotton picker, a revoluble picking cylinder having peripherally outstanding picking spindles, means including stripper bars assembled upon determined rows of picking spindles and being rotatable with the cylinder, means to guide the stripper bars causing them to move outwardly upon the spindles for shedding picked cotton and inwardly upon the spindles toward the cylinder, and means attached to successively adjacent stripper bars providing complete closures of the spaces between the stripper bars and conforming to the relative separation and closure of the stripper bars as they move outwardly and inwardly upon the said spindles.

5. In a cotton picker, a picking cylinder having peripherally outstanding picking spindles, means including stripper bars assembled upon determined rows of the spindles and being rotatable with the cylinder, relatively fixed cams guiding the stripper bars over an eccentric path during revolution of the cylinder causing outward and inward movement of the stripper bars upon the spindles thereby to shed the picked cotton, and aprons attached along parallel edges thereof to adjacent sides of the stripper bars providing complete closures for the spaces between the stripper bars and guarding against the passage of cotton around the stripper bars from the outer to the inner portions of the picking spindles.

6. In a cotton picker, a picking cylinder having peripherally outstanding picking spindles, means including stripper bars assembled upon determined rows of the spindles and being rotatable with the cylinder, relatively fixed cams guiding the stripper bars over an eccentric path during revolution of the cylinder causing outward and inward movement of the stripper bars upon the spindles thereby to shed the picked cotton, and aprons of flexible material attached along parallel edges thereof to the sides of adjacent stripper bars to form complete closures of the spaces between the stripper bars for the purpose described.

7. In a cotton picker including a picking cylinder, peripherally outstanding picking spindles, and stripper bars revolving with the cylinder and operating lengthwise of the spindles, means flexibly uniting the stripper bars and forming therewith a substantially unbroken wall around and protecting the cylinder.

8. In a cotton picker, a picking cylinder having peripherally outstanding picking spindles, means including vertically disposed stripper bars rotatable with the cylinder and operating lengthwise of the picking spindles for shifting cotton outwardly along the spindles, aprons disposed between the stripper bars to form complete closures between the stripper bars and prevent the passage of cotton therearound, and quickly detachable means by which said aprons are mounted upon adjacent stripper bars along the vertical edges.

9. In a cotton picker, a picking cylinder having peripherally outstanding picking spindles, means including vertically disposed stripper bars rotatable with the cylinder and operating lengthwise of the picking spindles for shifting cotton outwardly along the spindles, aprons disposed between the stripper bars to form closures of the spaces therebetween, and hinges by which the vertical edges of the apron are connected with the sides of adjacent stripper bars, the hinge pins being removable to permit quick detachment of the aprons.

10. In a cotton picker, a picking cylinder having peripherally outstanding picking spindles, means including vertically disposed stripper bars rotatable with the cylinder and operating lengthwise of the picking spindles for shifting cotton outwardly along the spindles, aprons of flexible material disposed between the stripper bars and providing complete coverings for the spaces therebetween, and hinges having leaves joined with the edges of the apron and with adjacent stripper bars, the pins of said hinges being removable for quick detachment of one or both sides of the apron.

11. In a cotton picker, a picking cylinder having peripherally outstanding picking spindles, means including vertically disposed stripper bars rotatable with the cylinder and operating lengthwise of the picking spindles for shifting cotton outwardly along the spindles, flexible aprons disposed between and connected with adjacent stripper bars to completely close the spaces therebetween, and means attached to the flexible aprons causing them to bend in a predetermined manner when the stripper bars move into proximity along the spindles.

12. In a cotton picker, a picking cylinder having peripherally outstanding picking spindles, means including vertically disposed stripper bars rotatable with the cylinder and operating lengthwise of the picking spindles for shifting cotton outwardly along the spindles, flexible aprons disposed between and connected with adjacent stripper bars to completely close the spaces therebetween, and a plurality of clips attached to each apron on one side thereof, being bent into substantial V-formation causing the aprons to bend into similar formation when the stripper bars move into proximity to each other along the spindles.

HIRAM NEWTON BERRY.